United States Patent [19]

Cirkler et al.

[11] 4,111,534
[45] Sep. 5, 1978

[54] OPTICAL DISPLAY DEVICE

[75] Inventors: Werner Cirkler, Ismaning; Hans Krüeger, Munich, both of Germany

[73] Assignee: Siemens Aktiengesellschaft, Berlin & Munich, Germany

[21] Appl. No.: 791,514

[22] Filed: Apr. 27, 1977

[30] Foreign Application Priority Data

Apr. 30, 1976 [DE] Fed. Rep. of Germany ........ 2619352

[51] Int. Cl.$^2$ ................................................. G02F 1/13
[52] U.S. Cl. ...................... 350/345; 350/347
[58] Field of Search ............... 350/345, 347, 334

[56] References Cited

U.S. PATENT DOCUMENTS

| 3,781,087 | 12/1973 | Nagasaki | 350/343 |
|---|---|---|---|
| 3,838,908 | 10/1974 | Channin | 350/334 |
| 3,864,905 | 2/1975 | Richardson | 350/345 X |
| 3,918,794 | 11/1975 | Milton | 350/347 |
| 3,950,078 | 4/1976 | Zatsky | 350/345 |
| 3,963,310 | 6/1976 | Giallorenzi et al. | 350/347 |
| 3,980,395 | 9/1976 | Giallorenzi et al. | 350/347 |
| 4,043,636 | 8/1977 | Eberhardt et al. | 350/345 |
| 4,054,362 | 10/1977 | Baues | 350/347 |

OTHER PUBLICATIONS

Bush et al.: "Liquid Crystal Display Device," *IBM Tech. Disc. Bull.*, vol. 14, p. 223, Jun., 1971.

*Primary Examiner*—Edward S. Bauer
*Attorney, Agent, or Firm*—Hill, Gross, Simpson, Van Santen, Steadman, Chiara & Simpson

[57] ABSTRACT

An optical display device having a high contrast in the light intensity of the image being displayed relative to the background light characterized by a liquid crystal cell having a layer of liquid crystal material interposed between spaced front and rear transparent carrier plates which have transparent electrodes on their inner surfaces facing the layer and a fluorescent plate of material, which has an index of refraction greater than 1, and fluorescent centers creating fluorescent light from an ambient light, being disposed behind the liquid crystal cell in the direction of viewing with the surface of the fluorescent plate being in direct contact with an outer surface of the rear carrier plate. In this device, a selective application of voltage to the selected electrodes of the cell will cause a change in the optical properties of the liquid crystal layer to decouple light from the display with an intensity substantially greater than the intensity of the background of the display. Preferably, the liquid crystal cell is received within a recess in the plate so that the outer surface of the front plate is flush with the remaining surface of the fluorescent plate. If desired, an additional illuminating device may be encapsulated within the plate to provide an additional source of light.

10 Claims, 1 Drawing Figure

U.S. Patent    Sept. 5, 1978    4,111,534
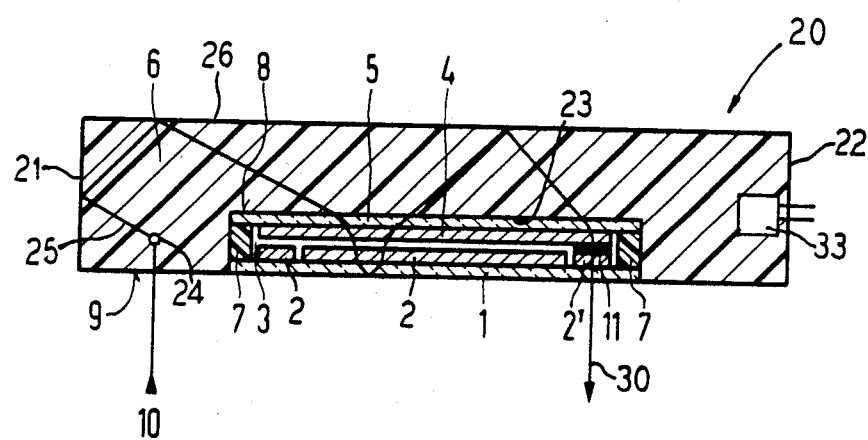

OPTICAL DISPLAY DEVICE

BACKGROUND OF THE INVENTION

1. Field of the Invention

The present invention is directed to an optical display or indicating device which utilizes a liquid crystal cell having a liquid crystal layer which is zonally switchable between different optical conditions by segmented electrodes which are disposed on inner surfaces of the carrier plates forming the cell. The device includes a fluorescent plate, which is disposed behind a liquid crystal cell in relation to the direction of viewing and which consists of a material with an index of refraction greater than 1 and contains fluorescent centers to produce fluorescent light.

2. Prior Art

A display, which has a high contrast between the symbols or image being displayed and the background light and includes a fluorescent plate which contains a plurality of fluorescent centers, has been proposed in German patent application No. P 25 54 226, whose disclosure was included in United States patent application Ser. No. 747,035 filed on Dec. 2, 1976. In the proposed device, a large part of the ambient light, which impinges upon the fluorescent plate, is held within the plate by transformation at the fluorescent centers and due to subsequent total reflection of the transformed or fluorescent light. The fluorescent light is finally passed out of the plate through light emergent or exit windows through a liquid crystal cell with a relatively high light intensity. With a large ratio of the light collecting area of the plate to the area of the light emitting or exit windows, the intensity of the light passing through the switchable zones of the liquid crystal cell has a greater intensity in relation to the light intensity of the background area. In the proposed cells of the German application, the fluorescent plate would extend laterally beyond the actual area of the cell and always contains the decoupling light exit window in the form of silvered notched that were aligned with the segment electrodes. The liquid crystal cell was a so-called "rotary cell" or "twisted nematic cell" which was provided with polarizers.

The above mentioned U.S. application suggested using a dynamic scattering cell with polarizers, and one embodiment utilized a dynamic scattering cell without polarizing to partially decouple the light from the display. However, this cell required either an additional fluorescent screen or diffusing plate in order to render the decoupled light visible to the viewer.

SUMMARY OF THE INVENTION

The present invention is directed to providing a modified display structure utilizing a liquid crystal and fluorescent plate which structure preserves all the advantages of the known arrangement such as a high contrast ratio but which structure is particularly compact in size and is very simple to produce. In addition, the present invention provides a structure, which does not require the display to include polarizers and does not have fixed exit or decoupling windows.

To accomplish these tasks, the present invention is directed to an optical display device having a high contrast and the intensity of the image being displayed relative to the background light with the display device comprising a liquid crystal cell having a layer of liquid crystal material interposed between spaced front and rear transparent carrier plates, said carrier plates on their inner surfaces facing the layer of the liquid crystal material being provided with transparent conductive coatings to form transparent electrodes with at least one of said coatings being interrupted to provide a plurality of separately excitable electrodes; and a fluorescent plate of material with an index of refraction greater than 1, said material having fluorescent centers creating fluorescent light from an ambient light, said fluorescent plate being disposed behind the liquid crystal cell in the direction of viewing with a surface of the fluorescent plate being in direct contact with an outer surface of the rear carrier plate so that an application of voltage to selected electrodes of the cell causes the change in the optical properties in a selected area of the liquid crystal layer to decouple light from the display with the intensity substantially greater than the intensity of the background of the display.

Preferably, the fluorescent plate has a recess of the size of a liquid crystal cell and the surface engaging the outer surface of the rear carrier plate is the base of this recess which preferably has a depth equal to the thickness of the liquid crystal cell so that the outer surface of the front carrier plate is flush with the remaining surfaces of the fluorescent plate. If desired, the display may also include an additional source of illumination or an illumination device which is embedded in the fluorescent plate.

To produce the device, the liquid crystal cell and if an additional illumination device is being included are placed in a mold having the dimensions of a fluorescent plate and the material of the fluorescent plate is then cast into the mold to form the optical display device.

In operation of the above mentioned devices, an applying of an electric voltage to the selected electrodes of the front and back plate selectively changes the optical properties of the liquid crystal layer disposed therebetween to create an exit window for the fluorescent light. The change in the optical properties may be due to altering the birefringent properties of the liquid crystal layer or by creating dynamic scattering in the liquid crystal layer disposed between the selected electrodes.

The proposed device and method of the present invention are based upon the following discovered phenomenon. If a boundary layer of a medium is coated with a plurality of layers parallel to one another of any desired thickness and any desired optical density, then a light in the medium, which light beam without the existence of these layers would be totally reflected at the boundary surface of the medium, in the same way will experience total reflection at one of the parallel boundary surfaces and be reflected or turned back into the medium. The entrapped beam can then only escape from the layer sandwich if it obtains a new direction through diffusion or through refraction on one of the oblique boundary surfaces. This outcoupling or decoupling condition of the device of the present invention will be located directly in switchable zones of the liquid crystal layer and will occur when an application of an electrical potential changes the optical property of the switchable zone. This change in optical properties may be roughly due to a condition of the so-called "dynamic scattering" which will occur by the application of an electrical potential or may be due to the changing of the birefringent properties, for example changing the domain structure in the switchable area. In this way it is possible for the activated or switchable liquid crystal zones of the layer to be displayed on a dark background and the device does not require the use of polarizers or other filters and does not require special light exit windows, which are constantly emitting light at their particular location. In addition, the light collecting area of the plate is automatically enlarged up to roughly the full area of the liquid crystal cell. Thus, with a startlingly simple means, an extremely high ratio between the collector area and the light emitting area can be obtained in a compact dimension or area. This advantage is particularly useful when the indicating or display device is to be employed in a casing of the smallest possible size, for example a wrist watch.

If the liquid crystal cell is completely received within a recess on the surface of the fluorescent plate, it is also possible to provide the display of the present invention with completely smooth surfaces on all sides. Since in normal cases, the supporting or carrier plates of the liquid crystal cell have only an insignificantly different optical density than the optical density of the fluorescent plate, the side edges of the recess do not need to be silvered and no bright edge indication will occur on the screen.

As mentioned hereinabove, the proposed arrangement may be equipped with an additional illumination source or device. By incorporating the additional illumination or light source into the fluorescent plate such as by embedding it therein, no additional space is required.

BRIEF DESCRIPTION OF THE DRAWING

The FIGURE is a cross-sectional view of an optical display device in accordance with the present invention.

DESCRIPTION OF THE PREFERRED EMBODIMENT

The principles of the present invention are particularly useful in an optical display device or indicating device generally indicated at 20 in the FIGURE. The device 20 includes a fluorescent plate 6 which may be of commercially available fluorescent material and a liquid crystal cell.

As illustrated, the liquid crystal cell has a front supporting or carrier plate 1 and a rear supporting or carrier plate 5, which plates are spaced from one another by means of a spacing frame 7. The carrier plate 1 on the inner surface is provided with a plurality of electrodes 2, which are formed by a coating of transparent electrically conductive material and may be arranged in any configuration such as a seven segment pattern or configuration. The inner surface of the rear carrier plate 5 is illustrated as being provided with a continuous rear electrode 4, which is also formed by a transparent conductive coating. A layer 3 of liquid crystal material is interposed between the two plates so that by the application of an electrical potential between the rear electrode 4 and one of the segment electrodes 2, selected areas of the layer 3 of liquid crystal material may have their optical properties changed such as area 11 which extends between electrode 2' and the rear electrode 4.

The fluorescent plate 6 will have its side edges such as 21 and 22 silvered or provided with a reflective coating and is disposed or assembled with a surface in direct contact to the outer surface of the rear carrier plate 5. In the illustrated embodiment, the fluorescent plate 6 is provided with a recess 8 having a bottom surface 23 which engages the outer surface of the plate 5. In addition, the recess 8 has a depth, which is equal to the thickness of the liquid crystal cell, so that a front face or surface 9 of the plate 6 is flush with an outer face or surface of the front carrier plate 1. As pointed out hereinabove, the material of the liquid crystal cell and the material of the fluorescent plate 6 are all conventional commercially available materials.

To illustrate the principle utilized in the device 20, a path of a beam 10 of ambient light enters the fluorescent plate 3. The beam 10 is first absorbed at one of the many fluorescent centers such as 24 which transforms or creates the fluorescent light, which is indicated by beam 25. As illustrated, the fluorescent light beam 25 is reflected by the silvered side or edge face 21 and totally reflected at a back surface 26 to pass into the liquid crystal cell. As the reflected beam passes through the layers of the liquid crystal cell, the angle of incidence will be dependent upon the index of refraction of each layer and it is possible that the beam will be split due to birefringence of the liquid crystal layer 3 into two beams and reflected back by the outer surface of the front carrier plate 1 as a result of total reflection. As illustrated, a potential is applied between the electrode 4 and 2' so that a portion, area or zone 11 of the liquid crystal layer 3 has different optical properties or conditions than the remaining un-energized or excited areas of the layer 3. Thus, a beam reflected into the area or zone 11 will be dynamically scattered and receive a new direction to exit the device 20 as a beam 30 of an indicated symbol or image.

Since the condition for the decoupling of the light, such as the beam 30, only occurs in the layer 3 of the liquid crystal material which had been excited or energized by the application of a potential, the decoupling windows are selectively created in the cell at the desired locations. Thus, unlike the devices which have decoupling windows formed by silvered notches, the decoupling windows are only created at those locations utilized for the particular image or symbol which is being displayed.

In the embodiment illustrated in the FIGURE, an additional light source 33 has been embedded in the fluorescent plate 6. The light source 33 can be energized to create additional light which will be entrapped in the plate 6 by the transformation into the fluorescent light as described hereinabove.

In addition, it should be noted that the leads for the electrodes such as 2 and 4 have not been shown for purposes of illustration and would extend to appropriate control means or switch arrangement utilized to produce the desired symbol. While the embodiment illustrates a segment electrode system, it should be noted that the liquid crystal cell can utilize other known types of electrode designs or patterns.

Although various minor modifications may be suggested by those versed in the art, it should be understood that we wish to embody within the scope of the patent warranted hereon, all such modifications as reasonably and properly come within the scope of our contribution to the art.

We claim:

1. An optical display device having a high contrast in the light intensity of the image being displayed relative to the background light, said display device comprising a liquid crystal cell having a layer of liquid crystal material interposed between spaced front and rear transparent carrier plates, said carrier plates on their inner surfaces facing the layer of liquid crystal material being provided with transparent conductive coatings to form transparent electrodes with at least one of said coatings being interrupted to provide a plurality of separately excitable electrodes; and a fluorescent plate of material with an index of refraction greater than 1, said material having fluorescent centers creating fluorescent light from an ambient light, said fluorescent plate being disposed behind the liquid crystal cell in the direction of viewing with a surface of the fluorescent plate being in direct contact with an outer surface of the rear carrier plate so that an application of a voltage to selected electrodes of the cell causes a change in the optical properties in a selected area of the liquid crystal layer to decouple light from the display with an intensity substantially greater than the intensity of the background of the display.

2. An optical display device according to claim 1, which further includes an additional illumination source, said source being embedded in said fluorescent plate.

3. An optical display device according to claim 1, wherein said fluorescent plate has a recess of a size of the liquid crystal cell, and wherein said surface engaging the outer surface of the rear carrier plate is the base of said recess.

4. An optical display device according to claim 3, wherein said recess has a depth equal to the thickness of the liquid crystal cells so that an outer surface of the front carrier plate is flush with the remaining surface of the fluorescent plate.

5. An optical display device according to claim 3, which includes additional source of illumination, said additional source being embedded in said fluorescent plate.

6. A method for producing an optical display device having a fluorescent plate of material with an index of refraction greater than 1, said material having fluorescent centers creating fluorescent light from ambient light, said fluorescent plate having a recess in one surface receiving a liquid crystal cell, said liquid crystal cell having a layer of liquid crystal material interposed between spaced rear and front carrier plates, said carrier plates on their inner surfaces facing the layer of liquid crystal material being provided with transparent conductive coatings to form electrodes with at least one of said coatings being interrupted to provide a plurality of separately excitable electrodes and an outer surface of the rear transparent carrier plate being in direct contact with a base surface of the recess, said method comprising placing the liquid crystal cell in a mold having a dimension of said fluorescent plate, and casting the material of the fluorescent plate into said mold to form the optical display device.

7. In a method according to claim 6, which includes prior to the step of casting inserting an illumination device into the mold along with the liquid crystal cell so that both the liquid crystal cell and illumination device are cast within the fluorescent plate.

8. A method of operating an optical display device having a high contrast in the light intensity of the image being displayed relative to the background light, said display device comprising a liquid crystal cell having a layer of liquid crystal material interposed between spaced front and rear transparent carrier plates, said carrier plates on their inner surface facing the layer of liquid crystal material being provided with transparent conductive coatings to form electrodes with at least one of said coatings being interrupted to provide a plurality of separable excitable electrodes, and a fluorescent plate of material with an index of refraction greater than 1, said material having fluorescent centers for creating fluorescent light from an ambient light, said fluorescent plate being disposed behind the light crystal cell in a direction of viewing with the surface of the fluorescent plate being in direct contact with an outer surface of the rear carrier plate, said process comprising selectively applying an electrical voltage to the electrodes on the front and back plate to selectively change the optical properties of the liquid crystal layer disposed therebetween to create an exit window for the fluorescent light.

9. A method according to claim 8, wherein said application of electrical potential creates dynamic scattering of the liquid crystal layer disposed between the selected electrode.

10. A method according to claim 8, wherein the application of electrical potential to the selected electrodes alters the birefringent properties of the liquid crystal layer disposed therebetween.

* * * * *